No. 861,254. PATENTED JULY 30, 1907.
T. F. & J. H. BRAIME.
SLIVER CAN.
APPLICATION FILED OCT. 26, 1905.

2 SHEETS—SHEET 1.

Witnesses.
William Sadler
Anne Park.

Inventors:—
Thomas Fletcher Braime
James Henry Braime
By H. Fairburn Hart
Attorney

THE NORRIS PETERS CO., WASHINGTON, D. C.

No. 861,254. PATENTED JULY 30, 1907.
T. F. & J. H. BRAIME.
SLIVER CAN.
APPLICATION FILED OCT. 26, 1905.

2 SHEETS—SHEET 2.

Witnesses:—
William Sadler
Annie Park

Inventors—
Thomas Fletcher Braime
James Henry Braime
By H. Fairburn Hart
Attorney

UNITED STATES PATENT OFFICE.

THOMAS FLETCHER BRAIME AND JAMES HENRY BRAIME, OF LEEDS, ENGLAND.

SLIVER-CAN.

No. 861,254.   Specification of Letters Patent.   Patented July 30, 1907.

Application filed October 26, 1905. Serial No. 284,492.

*To all whom it may concern:*

Be it known that we, THOMAS FLETCHER BRAIME and JAMES HENRY BRAIME, both of Goodman street, Hunslet, Leeds, in the county of York, England, subjects of the King of Great Britain and Ireland, have invented new and useful Improvements in or Relating to Sliver-Cans, of which the following is a specification.

This invention has for its object improvements in or relating to sliver and like cans such as are used in the textile industries, and it consists in constructing a sliver can,—the sides or body of which may be composed of sheet metal, or other suitable substance, such as, say, papier mâché, or board, or the like, which form a tubular structure open at the top and bottom and of any required shape in cross section,—and employing therewith two seamless rings or bands which are affixed to the upper extremities of the body, and a bottom which is secured to the lower end of the said body. The said rings and bottom are preferably, but not necessarily so, produced by dividing a suitable stamping into three parts, namely, two rings, and a shallow recessed portion, which, when inverted forms a suitable bottom for the sliver can. The said stamping is formed in the first instance in suitable dies out of a single sheet of suitable material, such as sheet steel, or the like, and constitutes a vessel having sides and a bottom piece and it is afterwards cut up into, say, three pieces to form the two rings and the bottom end piece. The said sides and bottom of the stamping have continuous or continuity of material the one with the other, and therefore are without any intervening seams or joints.

Figure 1:
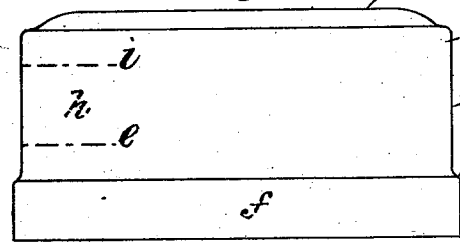
Figure 2:
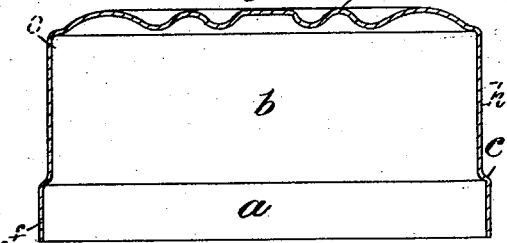
Figure 3:
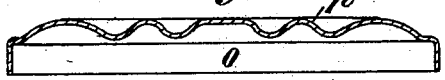
Figure 6:
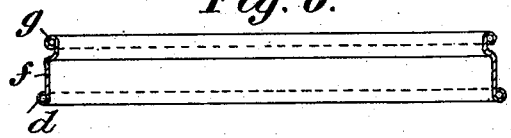
Figure 4:
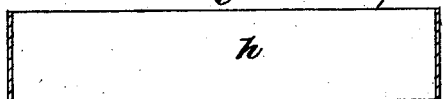
Figure 7:
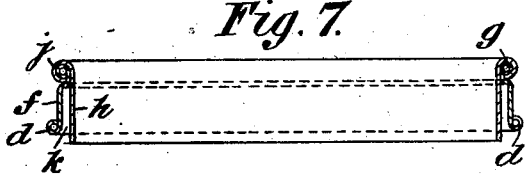
Figure 5:
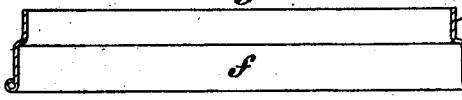
Figure 9:
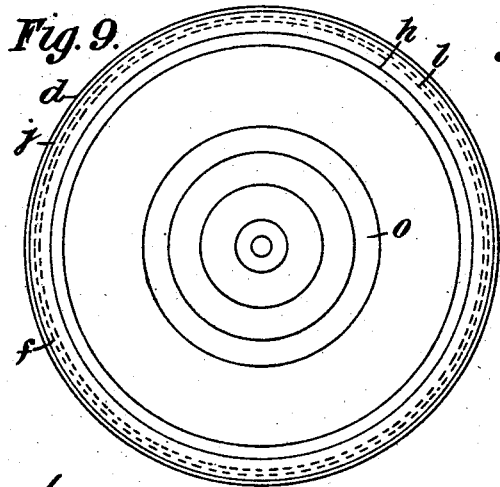
Figure 8:
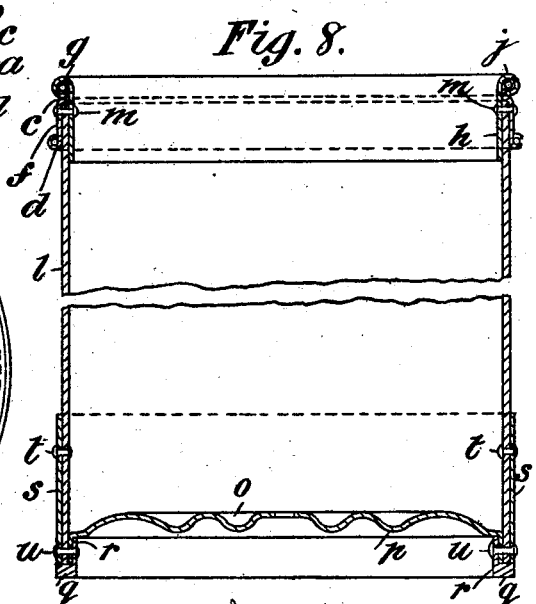
Figure 10:
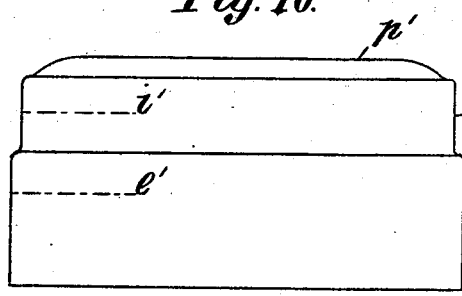
Figure 11:
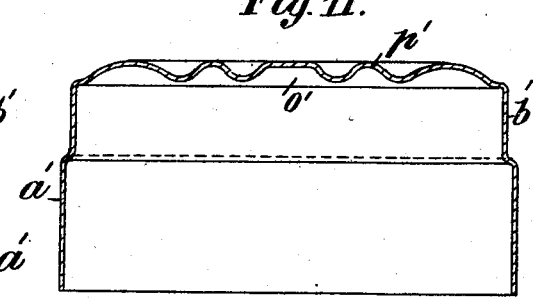
Figure 12:
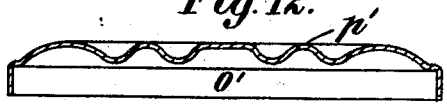
Figure 15:
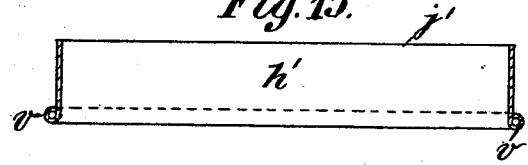
Figure 13:
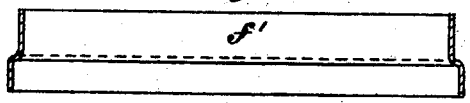
Figure 16:
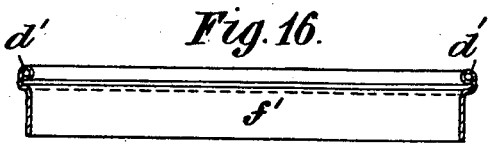
Figure 14:
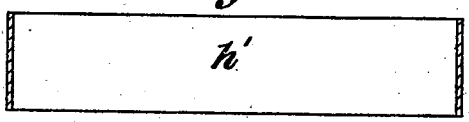
Figure 17:
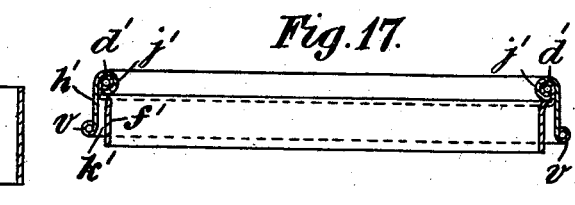
Figure 18:
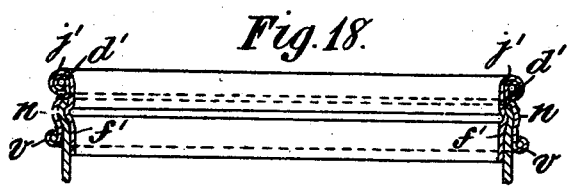

In the accompanying drawings Figure 1 is a front elevation of one form of stamping employed in carrying this invention into practice. Fig. 2 a sectional elevation of stamping shown at Fig. 1. Fig. 3 a sectional elevation of a severed portion of the stamping shown at Fig. 1 for forming, when inverted the bottom of a sliver can. Fig. 4 a sectional elevation of a severed tubular ring portion of stamping shown at Fig. 1. Fig. 5 a sectional elevation of another severed ring portion of stamping shown at Fig. 1 after it has had a portion of its sides curled outwards to form a beading around the upper remaining portion of the same. Fig. 6 a sectional elevation of a severed ring after it has had its smaller sized portion curled into an external beading. Fig. 7 is a sectional elevation of tubular ring shown at Fig. 6 with a second tubular ring inserted in its interior and having a portion of its material curled over a beading on the exterior ring. Fig. 8 a sectional elevation of a sliver can fitted with a combined ring, such as shown at Fig. 7, applied to the upper edge thereof and with a bottom constructed according to this invention. Fig. 9 a plan of same. Fig. 10 a front elevation of another form of stamping. Fig. 11 a sectional elevation of same. Fig. 12 a sectional elevation of a severed portion of stamping, shown at Fig. 10, forming when inverted into the bottom of a sliver can. Fig. 13 a sectional elevation of a severed portion of stamping shown at Fig. 10. Fig. 14 a sectional elevation of a severed portion of stamping shown at Fig. 10. Fig. 15 a sectional elevation of a severed portion of stamping shown at Fig. 11 after it has had a portion of its sides curled or beaded outwards. Fig. 16 a sectional elevation of a severed portion of stamping shown at Fig. 10 after it has had a portion of its sides curled inwardly to form a beading above its horizontal portion or step. Fig. 17 an elevation of a ring, as shown at Fig. 16, after it has been inserted in the interior of a second ring and a portion of the external ring after it has been curled inwardly over and around the beading on the internal ring. Fig. 18 a part sectional elevation of means for fixing the combined rings in position on the upper edge of the sliver can.

A stamping, such as shown at Figs. 1 and 2 is produced from a blank of metal in dies by ordinary means, and it is formed of two diameters $a$, $b$ as shown. The larger diameter $a$ which is at the top of the stamping is of the shortest length, and where the two diameters are united together by bending in the material a step $c$ is formed for purposes to be presently described. A tubular formation of metal hereafter termed a bead $d$ (Fig. 5), is formed by curling the upper edge of the larger diameter outwards around the outer surface of the sides or wall of the stamping. The stamping is then divided either at the point of junction of the said step $c$ with the portion $b$ below of a lesser diameter, or at a suitable distance therefrom as for instance say, along the dotted line $e$ Fig. 1 to form a ring $f$ similar to that shown at Fig. 5. The ring thus formed has the upper edge of the portion $a$ beaded out as just described, and a circular inwardly projecting portion $b$ of smaller diameter which terminates at the point of severance from the remaining portion of the stamping. The inner diameter of the portion $b$ is expanded until it is of the same diameter as the outer periphery of the remaining portion of the stamping. The upper edge of the portion $b$ is curled outwards to form a second bead $g$ (Fig. 6) in near proximity to the step $c$. A second ring $h$ is formed out the remaining portion of the stamping by severing it along, say, the dotted line $i$ (Fig. 1). The portion thus severed forms a ring with a straight parallel wall, the outer periphery of which is the same as the inner diameter of the sliver can $l$ Fig. 8. The ring $h$ is passed up the inside of the smaller diameter of ring $f$ until it projects a suitable distance as shown at Fig. 7. The lower edge $j$ of the ring $h$ is allowed to project below the bead $g$ and it is then curled over the latter for securing and interlocking the two rings together and thereby providing a space $k$ (Fig. 7) between the outer periphery of ring $h$ and the inner periphery of the ring $f$. The space $k$ forms a recess for receiving the upper edge of the body of the sliver can $l$.

In applying the combined rings $f$, $h$ to the upper edge of a sliver can $l$,—as shown at Fig. 8—and which forms a protector and strengthening piece for its upper edge and sides of the body of the can, the said combined rings are inverted to permit of the said edge of the sliver can $l$ being inserted in the recess $k$ until it comes in contact with the projection therein formed by the step $c$. The step $c$ provides the necessary means for readily regulating the position of the said rings upon the upper portion of the body of the sliver can. When in the required position the ring $h$ will be inside the mouth of the can $l$ and the ring $f$ on the outside thereof with the beaded portion $j$, $g$ and their joints above the upper edge of the body of the can. The bead $d$ is on the outside at a suitable distance below the said edge. The last named bead is employed for strengthening and protecting against collapse of the wall of the can. The uniting the rings $f$ and $h$ together and curling portions of them into the beaded form described a strong edge may be formed out of the material forming the said rings without necessarily using an additional strengthening wire or ring.

The combined rings $f$ and $h$ are secured in position with the upper edge of the can secured between them by any of the known or usual means employed for this purpose such as for example by rivets $m$ passing through the three thicknesses of material or by rolling or swaging one or more circumferential corrugations $n$ Fig. 18 in the said three thicknesses. The remaining portion of the stamping shown at Figs. 1 and 2 is made to constitute the bottom or end piece $o$ Fig. 3 for the can $l$. The flat surface $p$ Fig. 1 may be suitably corrugated by a number of concentric rings or recesses and projections to produce the undulating surface shown at Fig. 2. The end piece $o$ is inverted when placed in the lower portion of the body of the can $l$ as shown at Fig. 8 with its projecting flange downwards. The vertical flanges of the end piece $o$ and the lower edge of the body of the can $l$ are inserted in a recess or cavity formed in the foot band or piece $q$,—constructed as shown at Fig. 8,—as follows: A ring $q$ provided with an upwardly projecting flange $r$ on its inner edge. The external diameter of the ring $q$ is greater than the outer periphery of the can, while the internal diameter of the said ring is smaller than the inner periphery of the can. This permits of the ring overhanging the body portion of the can on the inner and the outer sidess thereof for providing a cavity for the reception of its lower edge. $s$ is a broad circular band or ring of the same diameter externally as the largest diameter of the ring $q$ and internally of the same diameter as the outer periphery of the body of the can $l$. The ring $s$ having been placed and fixed say, by rivets $t$ upon the outer periphery of the lower portion of the body of the can, the end piece $o$ is then inserted within the lower edge of the body of the can $l$ as shown at Fig. 8. The said parts are then placed upon the upper surface of the ring $q$ with the outer periphery of the projecting flange $r$ abutting against the inner periphery of the flange of the end piece $o$. The said parts are then secured together by any suitable means such as for example, say, by rivets $u$ which are made to pass through the four thicknesses of material.

When it is desired to form the two rings which when combined form the protection for the upper edge of the sliver can $l$ with beads on their inside instead of on the outside as previously herein described then the stamping is formed as shown at Figs. 10 and 11. That is to say, it is still made in two diameters $a'$ $b'$, but the larger diameter $a'$, is made of a greater depth than the smaller diameter $b'$ and its bottom surface is undulated as shown at $p'$ Figs. 11 and 12. In this instance the stamping is first divided along the dotted line $e'$ Fig. 10 to form the ring $h'$ Fig. 14. A beading $v$ Fig. 15 is formed around the upper edge of this ring $h'$ by curling the material outwards. It will be noted that in this arrangement this ring $h'$ becomes the outer of the two rings when they are combined together, consequently its inner diameter will require to be of such a diameter as will readily fit upon the outer periphery of the body of the can $l$. A second ring $f'$ Fig. 13 is next cut off the stamping along the dotted line $i'$ Fig. 10 and a bead $d'$ is formed around the upper edge by curling the material inwards and its external diameter is sufficiently decreased to permit of it passing within the ring $h'$. The ring $f$ is then inverted as shown at Fig. 16 and afterwards placed within the ring $h'$ with the bead $d'$ downwards. The edge $j'$ of the ring $h'$ is then curled inwards and around the bead $d'$ as shown at Fig. 17 for securing the two rings together, and also for forming a recess or cavity $k'$ for the reception of the upper edge of the body of the can $l$. The two rings when combined together may after being inverted be placed upon the upper edge of the body of the sliver can and secured thereto in a similar manner to that described for the arrangement shown at Fig. 8.

It will be readily understood that instead of forming the said two rings $f$ or $f'$ and $h$ or $h'$ and the end piece $o$ or $o'$ out of one stamping the several parts may each be produced separately and afterwards assembled together; as previously described or they may be formed out of two separate stampings, namely, one stamping of such a size and shape to form an end piece $o$ or $o'$ and a ring $f$ or $f'$ and a second stamping of such a size and shape as will be suitable to form an end piece $o$ or $o'$ and a ring $h$ or $h'$. By the latter arrangement two of the said end pieces would be formed to each combined ring.

By the herein described improved construction of a sliver can and by method of forming and assembling the parts together as above described, namely, by forming the two rings and the end piece out of one single blank sheet metal, means are provided whereby greatly additional resisting power against undue pressure is given to the upper and lower extremities of a sliver can, and a great saving is effected in material, as the whole of the blank used is converted into the portions required, whereas in the ordinary method of construction the blanks are required, the centers of two of them at the least are not utilized, which consequently adds very materially to the cost of the finished rings.

We declare that what we claim is:—

1. A protector and strengthening piece for sliver cans made in two portions, consisting of an internal ring and an external ring adapted to be interlocked together at their upper edges with a space between the external and the internal surfaces of the said rings, for receiving the upper portion of the can body with the interlocked portions above its upper edge.

2. A protector and strengthening piece for sliver cans consisting of two rings of different diameters and widths arranged to fit one within the other, one of said rings being of plain cylindrical formation, and the second ring formed of two different diameters and having a bead formed upon one of its edges, the said rings being interlocked together at the bead by coiling a portion of the material of the plain ring around the bead of the second ring said interlocked parts also constituting a strengthening bead formed out of the material of the two rings.

3. A protector and strengthening piece for sliver cans consisting of two rings, one of said rings being deeper than the second ring, the second ring having two different diameters with a bead on one of its edges said two rings being arranged to fit one within the other and to be secured and interlocked together by curling a portion of the first ring around the beaded portion of the second ring, whereby a cavity is formed between the straight portion of the first ring and the differences in the diameters of the second ring, substantially as set forth.

4. The combination with the body portion of a sliver can of a protector and strengthening piece for sliver cans, consisting of two rings of different diameters and widths arranged to fit one within the other, one of said rings being of plain cylindrical formation, and the second ring made in two diameters and with a bead formed on both its edges, said two rings after being inserted the one within the other are interlocked together by curling a portion of one ring around the beaded portion of the other ring, cavity with an open mouth for the reception of the upper portion of the said body portion and formed by the differences in the diameters of the two rings at a distance from the point of interlocking, and means for securing them to the upper portion of the said body with the interlocked portions above its top, substantially as set forth.

In testimony whereof we have signed our names to this specification in the presence of two subscribing witnesses.

THOMAS FLETCHER BRAIME.
JAMES HENRY BRAIME.

Witnesses:
WILLIAM SADLER,
ANNIE PARK.